Aug. 23, 1938.  H. W. TALBOT  2,127,706
COCKTAIL GLASS COOLER
Filed Dec. 23, 1935
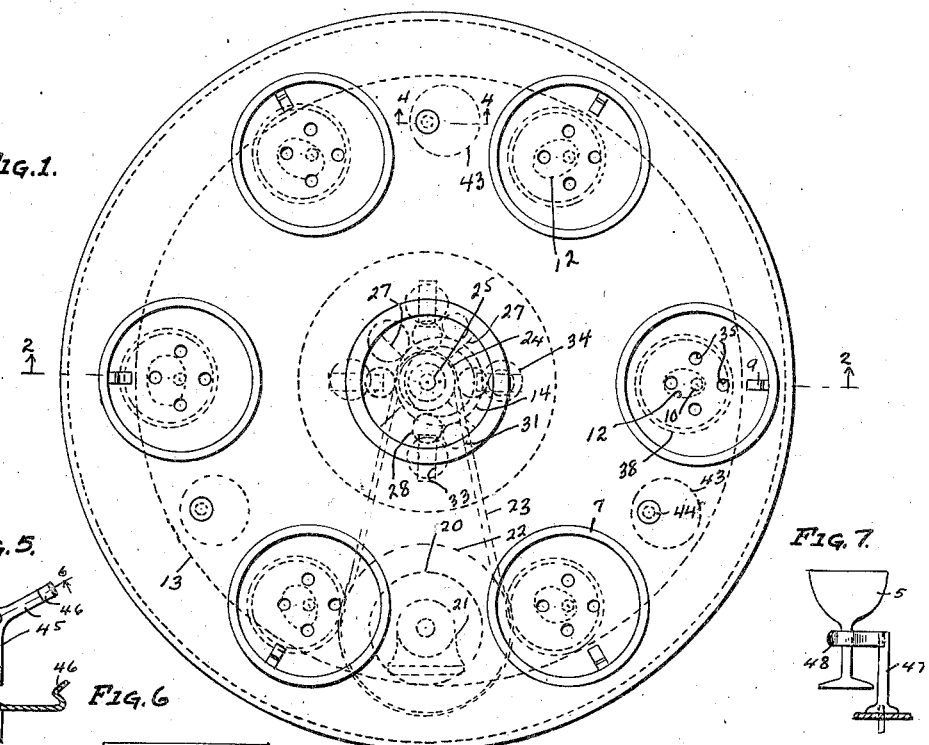
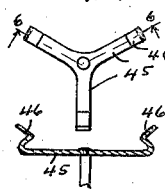
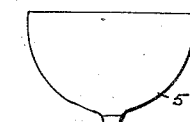
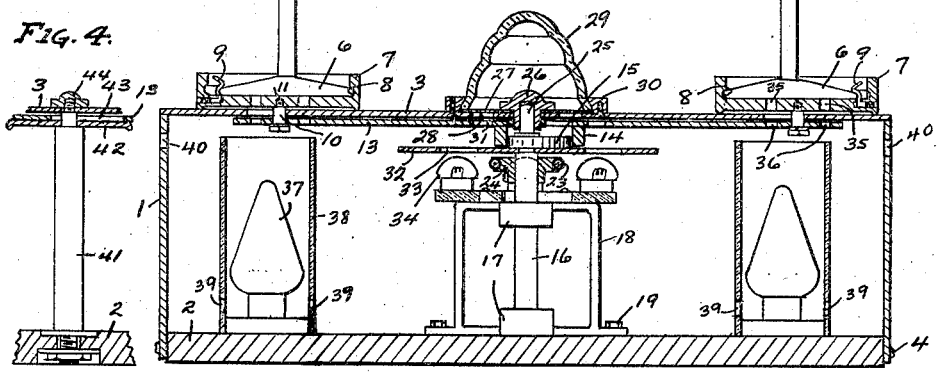
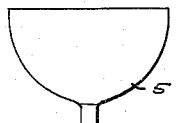
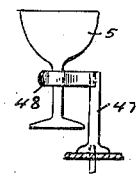
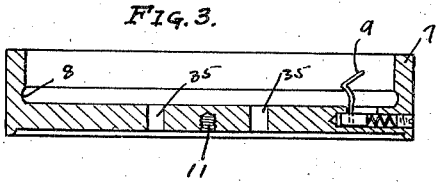
INVENTOR.
HARRY W. TALBOT
BY
Miller Boyken & Bried
ATTORNEYS.

Patented Aug. 23, 1938

2,127,706

UNITED STATES PATENT OFFICE 2,127,706

COCKTAIL GLASS COOLER

Harry W. Talbot, San Francisco, Calif.

Application December 23, 1935, Serial No. 55,880

12 Claims. (Cl. 259—54)

This invention relates to bar apparatus and has for its principal object a power-driven device upon which cocktail glasses or other drinking glasses may be placed with one or more pieces of ice in each glass, and the device will give the glasses an arcuate or oscillatory motion in a substantially horizontal plane of a nature to cause the ice to swing around the inside of the glasses to chill them preparatory to filling them with the desired beverage. A feature of the device is that as the glasses are thus agitated, changing colored lights will shine through the glasses and ice so as to make a very attractive display with the device positioned on a bar or other place visible to the gathered guests. Other features are compactness, and simplicity of mechanism, to make it a practical bar accessory. Still other features and advantages of the invention will appear in the following description and accompanying drawing.

In the drawing, Fig. 1 is a plan view of one form of a device illustrating the invention.

Fig. 2 is a vertical section of the device of Fig. 1 as seen from the line 2—2 thereof.

Fig. 3 is an enlarged vertical section of one of the glass holders.

Fig. 4 is a vertical section of a portion only of Fig. 1 as seen from the line 4—4 thereof.

Fig. 5 is a plan view of an optional form of glass holder.

Fig. 6 is a vertical section of the glass holder of Fig. 5 as seen from line 6—6 thereof.

Fig. 7 is an elevation of another variation of the glass holder with glass in position.

Fig. 8 is a plan view of the glass holder of Fig. 7 with glass omitted.

The drawing, which is illustrative merely of one way of carrying the invention into practice, shows the device to comprise a circular casing 1 having a bottom or base 2 and a top plate 3. The top plate and circular side walls 1 are preferably of sheet metal either permanently or removably secured together and the circular side wall removably secured to the bottom or base 2 as by screws 4, or otherwise, so as to make the mechanism within easily accessible. It is to be understood that while the casing is here shown as circular, this is illustrative only, as it may be of any shape.

As a practical matter, the casing should be as low as possible so that it will form, when placed on a bar, a little table or elevated platform upon which several glasses may be stood, and it will impart to them the required motion to swing the ice gently around the inside of the glasses. In Figs. 1 and 2 the top of the casing is large enough to receive six glasses 5, the bases 6 of which are clipped within shallow cups or holders 7 spaced around the top of the casing. The form of these holders or glass clips may vary considerably as they simply represent means to prevent the glasses from upsetting during the oscillation thereof. The holders 7 are shown with shallow rims recessed internally as at 8 into which one edge of the base 6 of the glass is resiliently forced by a small flat spring 9 acting on the opposite edge and formed in a manner so that it will snap over the edge of a glass placed in the holder yet permit ready withdrawal.

The holders 7 are each provided with a stud 10 preferably screwed into a tapped hole 11 in the base of the holder, and projecting through elongated or oval-shaped holes 12 in upper plate 3 and passing snugly through a disk 13 positioned quite close to the under side of top plate 3 and which may be supported by the heads of studs 10, as indicated, and which disk is given the oscillatory or arcuate motion desired to be transmitted to the glasses in the holders.

To oscillate disk 13 it is provided with a downwardly extending central annular hub 14 engaged interiorly by a circular cam or roller 15 carried eccentrically on a vertical shaft 16 rotatably mounted in spaced bearings 17 carried on a bracket 18 secured as at 19 to the bottom or base 2 of the casing.

Shaft 16 may be turned a few times a second by any suitable mechanical means, but here illustrated as by means of a small electric motor 20 preferably having a speed reduction device or gearing indicated at 21 in turn fitted with a sprocket or chain 22 fitted with chain or sprocket 23 passing over a pulley 24 secured to the vertical shaft so as to turn the same and oscillate the disk when the motor is energized by any convenient switch, not shown.

The upper end of the shaft 16 is reduced in diameter as at 25 and steadied by bearing support in a hub 26 which is clamped in a central opening in plate 3 and also clamps several flat annular segments 27 of "Celluloid", or the like, of different colors which respectively cover openings 28 in plate 3, and which colored segments are surmounted by a ribbed or wavy glass dome 29 held in place on plate 3 as by a ring 30 screwed thereto as indicated.

Disk 13 is also provided with openings 31 which, during the operation of the device, are shifted back and forth to more or less coincide with the openings in plate 3, while at the same time a thin opaque disk 32, apertured as at 33 and carried by shaft 16 just under cam 15, intermittently permits light to pass upward from several small electric globes 34 carried on bracket 18, and thereby send colored flashes out through glass dome 29 to be reflected in various directions.

Besides the lighting effects just described, the glass holders are apertured at 35 under the bases of the glasses, and similar apertures 36 are provided in disk 13 which during the shifting back and forth of the disk permits shafts of light to be projected upwardly from colored electric globes 37 to pass through the openings in the disk, large oval holes 12 in plate 3, and thence through the glasses to impinge the moving ice within the bowls of the glasses.

Electric globes 37 are preferably each of a different color, and are provided with tubular shields 38 so as to preserve their rays against undue admixture. The electric globes are, of course, very small ones, and while they give off but little heat, still ventilating holes 39, 40 may be provided in cases where the device runs for long periods of time. The electric wiring and switch have been omitted from the drawing as being well known construction not involved in the invention.

Fig. 4 of the drawing shows one of three posts 41 which may be used to support the oscillating disk 13 instead of having it suspended by studs 10. These posts are each secured to the casing base 2 and are provided with a large washer 42 resting on a shoulder formed on the post and on which washer the disk 13 rides while the reduced upper end of the post extends through a large opening 43 in disk 13 and secures in a fitting opening in outer or top plate 3 by means of a nut 44, all as clearly shown in Fig. 4.

Instead of using the shallow cups 7 to hold the glasses, a two or three-pronged, flat spring fork 45, as shown in Figs. 5 and 6, may be substituted, and the glasses simply placed between the prongs 46 which resiliently grip the base of the glass. The modification of glass holder shown in Figs. 7 and 8 uses a short post 47 in place of cup 7 and has a pair of wide spring fingers 48 projecting laterally, and between which fingers the stem of the glass is pushed as indicated in Fig. 7. Other arrangements suitable for the purpose will readily suggest themselves to anyone skilled in the art.

In contemplating the above disclosure it will be noted that the glasses are given a motion to correspond with the motion of a glass held in the hand and swung in a somewhat circular motion to make the ice go around the inside of the glass. This motion is herein and in the claims generally termed an "oscillatory" motion though no limitation is intended thereby as it is used to include any motion given the glass or glasses by mechanical means to effect the purpose intended, for this is thought to be new in the art. In this connection it should be noted that a mere rotation of a glass as might be effected by placing it upon a revolving phonograph disk supporting plate will not cause the ice to swing around as is intended, nor would a direct spinning of the glass as if placed over the rotating center of the table. The correct movement is had by holding the glass against spinning movement while at the same time swinging it bodily in an arcuate curve forming a closed figure, and preferably at slightly varying speeds as when following the more or less elliptical paths as effected by guiding the disk 13 in the elongated or elliptical holes 12 by means of the studs 10, and which motion will be seen to be a compound one, both in form and speed, due to the construction set forth.

Having thus described my invention and means for carrying it out, what I claim is:

1. Apparatus for cooling drinking glasses by shaking ice around in them, comprising a casing having a top, means on said top for supporting the glasses upright with ice in them, a member below said top extending under the several glasses when in position, an electric motor in the casing, and cam means actuated by said motor for moving said member, horizontally in a generally elliptical path of travel while maintaining the glasses respectively substantially against rotation on their vertical axis, and connections between said member and said glasses whereby the latter are moved in separate, spaced, generally elliptical paths of travel of generally the same size and shape as the path of travel of the member.

2. Apparatus for cooling drinking glasses by shaking ice around in them, comprising a casing having a top, means on said top for supporting the glasses upright with ice in them, a member below said top extending under the several glasses when in position, an electric motor in the casing, cam means actuated by said motor for moving said member horizontally in a generally elliptical path of travel while maintaining the glasses respectively substantially against rotation on their vertical axis, connections between said member and said glasses whereby the latter are moved in separate, spaced, generally elliptical paths of travel of generally the same size and shape as the path of travel of the member, and lights in said casing arranged to shine through openings in said top and through said glasses, intermittently during the oscillation of said member.

3. Apparatus for cooling drinking glasses with ice, comprising means for supporting a plurality of drinking glasses upright in laterally spaced relation, means for moving the supported glasses simultaneously in a generally oscillatory manner in a horizontal plane in substantially similar sized separate bodily and distinct, arcuate paths of travel whereby a lump of ice placed within each glass will swing around the lateral inner sides of the glass.

4. Apparatus for cooling drinking glasses with ice, comprising means for supporting a plurality of stem-type drinking glasses upright in laterally spaced relation including arms adapted to yieldably engage the bases of the glasses, means for moving the supported glasses simultaneously in a generally oscillatory manner in a horizontal plane in substantially similar sized, separate distinct, arcuate paths of travel whereby a lump of ice placed within each glass will swing around the lateral inner sides of the glass.

5. Apparatus for cooling drinking glasses with ice, comprising means for supporting a plurality of drinking glasses upright in laterally spaced relation, means for moving the supported glasses, simultaneously in a horizontal plane in separate distinct generally elliptical paths of travel whereby a lump of ice placed within each glass will swing around the lateral inner sides of the glass.

6. Apparatus for cooling drinking glasses with ice, comprising a horizontal table member, means adapted to removably secure a row of stem-type drinking glasses at their bases in laterally spaced relation, and in upright position, on said table member, means for moving the table member in a horizontal plane in an arcuate path of travel, means for maintaining the table member against substantial rotation about its vertical axis whereby the glasses thereon will move in separate paths of travel generally similar to the path of travel of the table member and whereby a lump of ice placed within each glass will swing around the lateral inner sides of the glass.

7. In a construction as defined in claim 6, the path of travel of said table member being generally elliptical and the movement of the table member in said path being continuous in one direction.

8. In a construction as defined in claim 6, said row being substantially circular and the means adapted to removably secure the glasses on said member comprising spring arms adapted to engage over the bases of said glasses.

9. Apparatus for cooling cocktail glasses, and the like, with ice, comprising means for supporting a plurality of glasses upright with one or more pieces of ice within each, and means for simultaneously moving the supported glasses in a generally oscillatory manner in a horizontal plane in separate, substantially similar sized, arcuate, paths of travel whereby the ice will swing around their interiors, the means for supporting the glasses including a holder engaging the base of each glass taking the form of a shallow cup in which the base of the glass is frictionally engaged.

10. Apparatus for cooling cocktail glasses, and the like, with ice, comprising means for supporting a plurality of stem-type glasses upright with one or more pieces of ice within each, and means for simultaneously moving the supported glasses in a horizontal plane in separate, distinct, substantially similar-sized, generally elliptical paths of travel whereby the ice will swing around their interiors, the means for holding the glasses including a plurality of pairs of fingers extending laterally and between each pair of which the stem of one of the glasses is adapted to be positioned.

11. Apparatus for cooling cocktail glasses, and the like, with ice, comprising means for supporting a plurality of stem-type glasses upright with one or more pieces of ice within each, and means for simultaneously moving the supported glasses in a generally oscillatory manner in a horizontal plane in separate, distinct, substantially similar-sized, arcuate paths of travel whereby the ice will be swung around their interiors, the means for holding the glasses including a plurality of pairs of spring fingers for each glass, each pair of fingers being arranged and adapted to resiliently grip the stem of one of the glasses therebetween.

12. In apparatus of the character described, means arranged and adapted for supporting a plurality of drinking glasses upright in laterally spaced relation, means for moving the supported glasses simultaneously in a generally oscillatory manner in substantially similar sized, separate, arcuate paths of travel in a horizontal plane only, and means for maintaining the individual glasses substantially against rotation during each oscillatory movement thereof relative to their respective vertical axes, whereby a lump of ice placed within each glass will swing around the lateral inner sides of the glass.

HARRY W. TALBOT.